United States Patent
Genta et al.

(10) Patent No.: US 8,656,366 B2
(45) Date of Patent: Feb. 18, 2014

(54) MICROPROGRAMMABLE DEVICE CODE TRACING WITH SINGLE PIN TRANSMISSION OF EXECUTION EVENT ENCODED SIGNAL AND TRACE MEMORY STORING INSTRUCTIONS AT SAME ADDRESS

(75) Inventors: Claudio Genta, Orbassano (IT); Alberto Manzone, Orbassano (IT)

(73) Assignee: C.R.F. Societa Consortile per Azioni, Orbassano (IL)

( * ) Notice: Subject to any disclaimer, the term of this patent is extended or adjusted under 35 U.S.C. 154(b) by 748 days.

(21) Appl. No.: 12/848,929

(22) Filed: Aug. 2, 2010

(65) Prior Publication Data

US 2011/0047363 A1 Feb. 24, 2011

(30) Foreign Application Priority Data

Aug. 3, 2009 (EP) .................................... 09425318

(51) Int. Cl.
*G06F 11/30* (2006.01)
(52) U.S. Cl.
USPC ............................ 717/128; 712/227; 717/127
(58) Field of Classification Search
None
See application file for complete search history.

(56) References Cited

U.S. PATENT DOCUMENTS

| | | | | |
|---|---|---|---|---|
| 5,964,863 A | * | 10/1999 | Liu et al. | ........................ 712/32 |
| 6,289,300 B1 | * | 9/2001 | Brannick et al. | ................ 703/28 |
| 7,904,755 B2 | * | 3/2011 | Patel | .............................. 714/37 |
| 2008/0082801 A1 | | 4/2008 | Edgar | |
| 2009/0187747 A1 | | 7/2009 | Mayer | |

FOREIGN PATENT DOCUMENTS

GB 2438699 12/2007

* cited by examiner

*Primary Examiner* — Kenneth Kim
(74) *Attorney, Agent, or Firm* — Baker & Hostetler LLP

(57) ABSTRACT

A microprogrammable electronic device has a first code memory storing instructions, and is configured to execute each instruction in the first code memory at a respective instruction cycle. The system comprises binary code generating means, and a tracing device. The binary code generating means form part of the device, and are configured to generate and output on a single pin of the device binary codes, each of which indicates a corresponding execution-related event, is generated and outputted at a corresponding instruction cycle, and has N bits, where N is an integer >=2. The tracing device is coupled with the single pin to receive the binary codes, and has a second code memory in which the instructions are stored. The tracing device is configured to trace instructions executed by the device, on the basis of the received binary codes and of the instructions stored in the second code memory.

14 Claims, 1 Drawing Sheet

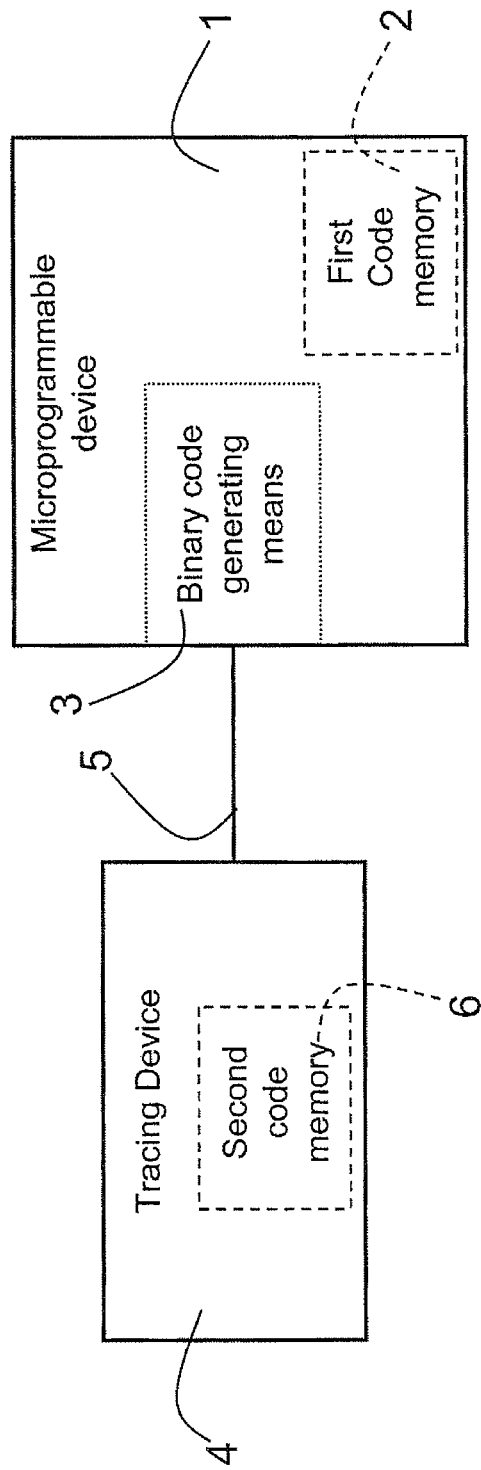

MICROPROGRAMMABLE DEVICE CODE TRACING WITH SINGLE PIN TRANSMISSION OF EXECUTION EVENT ENCODED SIGNAL AND TRACE MEMORY STORING INSTRUCTIONS AT SAME ADDRESS

CROSS-REFERENCE TO RELATED APPLICATIONS

This application claims priority to European Patent Application No. 09425318.4, filed on Aug. 3, 2009, the contents of which is incorporated by reference herein in its entirety.

TECHNICAL FIELD

The present invention relates to microprogrammable device code tracing.

BACKGROUND

As is known, a microprogrammable device is an electronic device comprising: a processor; a code memory storing a software and/or firmware code comprising a set of instructions to be executed; and a data memory storing values of variables used in executing the code.

When in use, the microprogrammable devices execute the code, i.e. the instructions, stored in the code memory.

More specifically, the microprogrammable devices execute each instruction at a corresponding instruction cycle.

Moreover, the microprogrammable devices, each time they execute an instruction, update a register known as program counter, which stores the address of the code memory at which the next instruction to be executed is stored.

To find and eliminate any errors in, i.e. to debug, the code of a microprogrammable device, the code is traced.

Tracing the code means determining a sequence of instructions executed by the microprogrammable device.

Top-of-the-range microprogrammable devices are known which feature a high-speed code tracing interface comprising a number of pins.

More specifically, by means of the interface, it is possible to communicate the addresses of all the instructions executed.

To trace the code of a top-of-the-range microprogrammable device of this sort, a tracer, i.e. an electronic code tracing device, is connected to the code tracing interface of the microprogrammable device.

The tracer comprises a respective code memory in which the instructions of the code of said microprogrammable device are stored at the same addresses as in the code memory of said microprogrammable device.

Via the tracing interface, the tracer acquires the addresses of the instructions executed by the microprogrammable device, and reconstructs the executed instruction sequence on the basis of the acquired addresses and of the code stored in its own respective code memory, more specifically on the basis of the instructions stored in its own respective code memory at the acquired addresses.

The Applicant, however, has observed that, using current techniques, microprogrammable device code tracing places a heavy load on the hardware resources of the microprogrammable device, especially in terms of the microprogrammable device pins necessary to communicate the executed instruction addresses.

In fact, for example, assuming the microprogrammable device code memory stores a thousand instructions, and each pin transmits a corresponding bit of the executed instruction addresses, the microprogrammable device would need at least ten pins to communicate the executed instruction addresses.

And, if the number of instructions stored is increased, the microprogrammable device may need even more pins to communicate the executed instruction addresses.

SUMMARY

The objective of present invention is then to provide a system for tracing instructions executed by a microprogrammable device, which system can alleviate the above cited drawback.

This objective is achieved by the present invention in that it relates to a system for tracing instructions executed by a microprogrammable electronic device, as claimed in the attached claims.

BRIEF DESCRIPTION OF THE DRAWINGS

For a better understanding of the present invention, a preferred embodiment, which is intended purely by way of example and is not to be construed as limiting, will now be described with reference to FIG. 1, which shows schematically a system, according to the present invention, for tracing instructions executed by a microprogrammable device.

DETAILED DESCRIPTION OF ILLUSTRATIVE EMBODIMENTS

The following discussion is presented to enable a person skilled in the art to make and use the invention. Various modifications to the embodiments will be readily apparent to those skilled in the art, without departing from the scope of the present invention as claimed.

Thus, the present invention is not intended to be limited to the embodiments shown, but is to be accorded the widest scope consistent with the principles and features disclosed herein and defined in the appended claims.

According to the present invention, there is provided a system for tracing the instructions executed by a microprogrammable device.

FIG. 1 shows schematically a system, according to a preferred embodiment of the present invention, for tracing the instructions executed by a microprogrammable device.

More specifically, microprogrammable device 1 comprises a first code memory 2 storing instructions.

The microprogrammable device 1 is configured to execute each of the instructions stored in the first code memory 2 at a respective instruction cycle.

With reference to the attached drawing, the system for tracing the instructions executed by the microprogrammable device 1 comprises: binary code generating means 3; and a tracing device 4.

More specifically, the binary code generating means 3 are supplied in, i.e., form part of, the microprogrammable device 1, and are configured to generate and output on a single pin 5 of the microprogrammable device 1 binary codes, each of which comprises N bits, where N≥2, indicates a corresponding execution-related event, and is generated and outputted at a corresponding instruction cycle.

With reference to the attached drawing, the tracing device 4 is coupled with the single pin 5 to receive said binary codes, and comprises a second code memory 6 storing said instructions.

More specifically, the tracing device 4 is configured to trace, i.e. determine, the instructions executed by the microprogrammable device 1 on the basis of the received binary codes and of said instructions stored in the second code memory 6.

The binary code generating means 3 are preferably configured to generate and output a current binary code in a current instruction cycle in which a corresponding execution-related event, indicated by the current binary code, occurs.

Each instruction is conveniently stored at a same respective memory address in the first code memory 2 and in the second code memory 6, the memory addresses are arranged in a same given sequence in the first code memory 2 and in the second code memory 6, and said current binary code indicates one of the following execution-related events: the microprogrammable device 1 is executing a first or second predetermined instruction in the current instruction cycle; the microprogrammable device 1 is executing, in the current instruction cycle, a first current instruction stored, in the first code memory 2 and in the second code memory 6, at a first memory address which, in the given sequence in which the memory addresses are arranged in the first code memory 2 and in the second code memory 6, follows a second memory address at which is stored, in the first code memory 2 and in the second code memory 6, a first preceding instruction executed by the microprogrammable device 1 in the instruction cycle temporally preceding the current instruction cycle; the microprogrammable device 1 is executing a first instruction of a predetermined interrupt routine in the current instruction cycle; the microprogrammable device 1, in the current instruction cycle, is executing either a second current instruction which is the same as a second preceding instruction executed by the microprogrammable device 1 in the instruction cycle temporally preceding the current instruction cycle;

or a third current instruction stored, in the first code memory 2 and in the second code memory 6, at a third memory address which, in the given sequence in which the memory addresses are arranged in the first code memory 2 and in the second code memory 6, does not follow a fourth memory address at which is stored, in the first code memory 2 and in the second code memory 6, a third preceding instruction executed by the microprogrammable device 1 in the instruction cycle temporally preceding the current instruction cycle.

More specifically, said second current instruction is a wait instruction which, when executed by the microprogrammable device 1, causes the microprogrammable device 1 to: check whether a predetermined condition occurs; and continue executing said wait instruction until said predetermined condition occurs.

The tracing device 4 is conveniently configured to start tracing the instructions executed by the microprogrammable device 1 when it receives the binary code indicating that the microprogrammable device 1 is executing said first predetermined instruction.

The tracing device 4 is also configured to stop tracing the instructions executed by the microprogrammable device 1 after a given time lapse from when it receives the binary code indicating that the microprogrammable device 1 is executing said second predetermined instruction.

More specifically, the microprogrammable device 1 is not configured to operate as so-called context-switching hardware; only one, i.e. said predetermined, interrupt routine is stored in the first code memory 2; and the first code memory 2 stores neither so-called "trap instructions", nor instructions which, when executed by the microprogrammable device 1, generate execution exceptions, e.g. a division by zero.

Moreover, the instruction tracing steps performed by the microprogrammable device 1 are as follows: the binary code generating means 3 are supplied with a start-trace memory address, i.e. the memory address at which said first predetermined instruction is stored in the first code memory 2, and with an end-trace memory address, i.e. the memory address at which said second predetermined instruction is stored in the first code memory 2; a debug mode of the microprogrammable device 1 is activated, and the pin 5 is initially deactivated; and when the microprogrammable device 1 executes the instruction stored at the start-trace memory address, the pin 5 is activated, the binary code generating means 3 generate and output on the pin 5 a synchronization binary code, and the tracing device 4, on receiving said synchronization binary code, is synchronized with execution of the instructions by the microprogrammable device 1 and identifies as the currently executed instruction the instruction stored at the start-trace memory address.

At this point, the tracing device 4 knows the instruction currently being executed by the microprogrammable device 1, and, for the next instruction cycle, the instruction being executed need not be transmitted.

In fact, given the currently executed instruction, only one of the following four execution-related events can occur at the next instruction cycle:

1. a synchronization event, i.e. the instruction stored at the start-trace memory address or the instruction stored at the end-trace memory address is executed at the next instruction cycle;

2. the instruction stored at the memory address following that of the currently executed instruction is executed at the next instruction cycle;

3. the only one interrupt routine is activated at the next instruction cycle, i.e. the first instruction of said predetermined interrupt routine is executed;

4. a wait instruction is currently being executed, so, at the next instruction cycle, either the wait instruction is executed again, or a skip is performed and the instruction stored at the skip destination address is executed.

Employing a communication frequency over the pin 5, between the tracing device 4 and the binary code generating means 3, which is at least twice the code execution frequency of the microprogrammable device 1, it is therefore possible to transmit at least two bits per instruction cycle.

The binary code generating means 3 can thus communicate to the tracing device 4 which of the above four execution-related events has occurred, and the tracing device 4, by comprising the second code memory 6, in which the instructions of the microprogrammable device 1 are stored at the same respective memory addresses as in the first code memory 2, is able to determine the instructions executed by the microprogrammable device 1.

Moreover, when a synchronization event occurs: the tracing device 4, if it is not already tracing the instructions executed by the microprogrammable device 1, starts tracing; or the tracing device 4, if it is already tracing the instructions executed by the microprogrammable device 1, stops tracing, preferably after a predetermined time lapse from when the synchronizing event occurred.

So far, specific reference has been made to single-exit wait instructions, i.e. wait instructions that keep the microprogrammable device 1 in a wait state pending one predetermined condition.

That is, when the one predetermined condition occurs, the microprogrammable device 1 executes a corresponding predetermined instruction at the instruction cycle following the one in which the one predetermined condition occurs.

In the case of multiple-exit wait instructions, on the other hand, the microprogrammable device 1 remains in a wait state pending one of a number of predetermined conditions.

That is, when one of said number of predetermined conditions occurs, microprogrammable device 1 executes, at the instruction cycle following the one in which said condition occurs, a predetermined instruction corresponding to the condition that has occurred.

If the first code memory 2 stores multiple-exit wait instructions, the above four execution-related events are therefore no longer sufficient to represent all the execution-related events that might occur, so the binary code generating means 3 generate and output binary codes, each comprising N number of bits greater than two, i.e. N>2.

As stated, the binary code generating means 3 preferably generate and output each of said binary codes at a corresponding instruction cycle.

If this is not possible, i.e. if only two bits per instruction cycle can be transmitted over the pin 5, then the binary code generating means 3 may conveniently comprise an internal memory (not shown in the attached drawing), e.g. made up of flip-flops, of First-In-First-Out (FIFO) type and configured to store the generated binary codes.

In which case, when the microprogrammable device 1 executes a multiple-exit wait instruction at a given instruction cycle, the binary code generating means 3 may conveniently be configured to: generate the corresponding binary code and transmit it over the pin 5 at the given instruction cycle and at M instruction cycles following the given instruction cycle, where M≥1; and generate and store in said internal memory the binary codes indicating execution-related events occurring at said M instruction cycles following the given instruction cycle.

The binary codes stored in said internal memory may therefore be conveniently transmitted by the binary code generating means 3 over the pin 5 at the instruction cycles following said M instruction cycles, and in the order in which they are stored in the internal memory, i.e. in First-In-First-Out (FIFO) order, while the new binary codes generated in the meantime by the binary code generating means 3 may conveniently be stored in the internal memory.

Moreover, when the microprogrammable device 1 executes a non-instantaneous wait instruction, i.e. a wait instruction executed by the microprogrammable device 1 at more than one instruction cycle, i.e. for which a respective wait state exit condition does not occur immediately, synchronization of the binary codes transmitted over the pin 5 by the binary code generating means 3 and the instructions executed by the microprogrammable device 1 can be recovered, if said non-instantaneous wait instruction is executed by the microprogrammable device 1 for L number of instruction cycles sufficient to allow transmission over the pin 5 of all the binary codes stored in the internal memory, and of at least one binary code indicating execution of said non-instantaneous wait instruction.

Finally, the tracing device 4 is able to decode the sequence of received binary codes into instructions, so that only the last part of the sequence, as opposed to the whole sequence, need be stored.

The advantages of the present invention will be clear from the above description.

In particular, it is important to note how, unlike known code tracing techniques, the present invention provides for tracing a microprogrammable device code using only one pin of the microprogrammable device.

Clearly, changes may be made to the present invention without, however, departing from the scope of the invention, as defined in the appended claims.

What is claimed:

1. A system for tracing instructions executed by a microprogrammable electronic device, the microprogrammable electronic device comprising a first code memory, in which instructions are stored, and being configured to execute each of the instructions stored in the first code memory at a respective instruction cycle, the system comprising:
   binary code generating means and a tracing device;
   the binary code generating means forming part of the microprogrammable electronic device, and being configured to generate and output on a single pin of the microprogrammable electronic device binary codes, each of which indicates a corresponding execution-related event, is generated and outputted at a corresponding instruction cycle, and comprises N bits, where N is an integer greater than or equal to two;
   the tracing device being coupled with the single pin to receive the binary codes, and comprising a second code memory in which the instructions are stored, each instruction being stored in the second code memory at a memory address corresponding to a memory address in the first code memory in which that instruction is stored; and
   the tracing device being configured to trace instructions executed by the microprogrammable electronic device, on the basis of the received binary codes and of the instructions stored in the second code memory.

2. The system of claim 1, wherein the binary code generating means are configured to generate and output a current binary code at a current instruction cycle, in which the corresponding execution-related event indicated by the current binary code occurs.

3. The system of claim 2, wherein the memory, addresses are arranged in a same given sequence in the first and in the second code memory and wherein the current binary code indicates one of following execution-related events:
   the microprogrammable electronic device is executing a first or second predetermined instruction in the current instruction cycle;
   the microprogrammable electronic device, in the current instruction cycle, is executing a first current instruction stored, in the first and in the second code memory, at a first memory address which, in the given sequence in which the memory addresses are arranged in the first and in the second code memory, follows a second memory address at which is stored, in the first and in the second code memory, a first preceding instruction executed by the microprogrammable electronic device in the instruction cycle temporally preceding the current instruction cycle;
   the microprogrammable electronic device is executing a first instruction of a predetermined interrupt routine in the current instruction cycle; or
   the microprogrammable electronic device, in the current instruction cycle, is executing:
   either a second current instruction which is the same as a second preceding instruction executed by the microprogrammable electronic device in the instruction cycle temporally preceding the current instruction cycle;
   or a third current instruction stored, in the first and in the second code memory, at a third memory address which, in the given sequence in which the memory addresses are arranged in the first and in the second code memory, does not follow a fourth memory address at which is stored, in the first and in the second code memory, a third preceding instruction, executed by the microprogrammable electronic device in the instruction cycle temporally preceding the current instruction cycle.

4. The system of claim 3, wherein the second current instruction is a wait instruction which, when executed by the microprogrammable electronic device, causes the microprogrammable electronic device to check whether a predetermined condition occurs, and to continue executing the wait instruction until the predetermined condition occurs.

5. The system according to claim 3, wherein the tracing device is also configured to start tracing the instructions executed by the microprogrammable electronic device when it receives the binary code indicating that the microprogrammable electronic device is executing the first predetermined instruction.

6. The system according to claim 3, wherein the tracing device is also configured to stop tracing the instructions executed by the microprogrammable electronic device, after a given time lapse from when it receives the binary code indicating that the microprogrammable electronic device is executing the second predetermined instruction.

7. A method for tracing instructions executed by a microprogrammable electronic device, the microprogrammable electronic device comprising a first code memory, in which instructions are stored, and being configured to execute each of the instructions stored in the first code memory at a respective instruction cycle, comprising:
   generating binary codes, each of which indicates a corresponding execution-related event; and
   outputting the binary codes to a tracing device on a single pin of the microprogrammable electronic device at a corresponding instruction cycle, each binary code comprising N bits, where N is an integer greater than or equal to two, the tracing device being coupled with the single pin to receive the binary codes, and comprising a second code memory in which the instructions are stored, each instruction being stored in the second code memory at a memory address corresponding to a memory address in the first code memory in which that instruction is stored.

8. The method of claim 7, further comprising:
   generating and outputting a current binary code at a current instruction cycle, in which the corresponding execution-related event indicated by the current binary code occurs.

9. The method of claim 8, wherein the memory addresses are arranged in a same given sequence in the first and in the second code memory, and wherein the current binary code indicates one of following execution-related events:
   the microprogrammable electronic device is executing a first or second predetermined instruction in the current instruction cycle;
   the microprogrammable electronic device, in the current instruction cycle, is executing a first current instruction stored, in the first and in the second code memory, at a first memory address which, in the given sequence in which the memory addresses are arranged in the first and in the second code memory, follows a second memory address at which is stored, in the first and in the second code memory, a first preceding instruction executed by the microprogrammable electronic device in the instruction cycle temporally preceding the current instruction cycle;
   the microprogrammable electronic device is executing a first instruction of a predetermined interrupt routine in the current instruction cycle; or
   the microprogrammable electronic device, in the current instruction cycle, is executing:
      either a second current instruction which is the same as a second preceding instruction executed by the microprogrammable electronic device in the instruction cycle temporally preceding the current instruction cycle; or
      a third current instruction stored, in the first and in the second code memory, at a third memory address which, in the given sequence in which the memory addresses are arranged in the first and in the second code memory, does not follow a fourth memory address at which is stored, in the first and in the second code memory, a third preceding instruction, executed by the microprogrammable electronic device in the instruction cycle temporally preceding the current instruction cycle.

10. The method of claim 9, wherein the second current instruction is a wait instruction which, when executed by the microprogrammable electronic device, causes the microprogrammable electronic device to check whether a predetermined condition occurs, and to continue executing the wait instruction until the predetermined condition occurs.

11. A non-transitory computer-readable storage medium for tracing instructions executed by a microprogrammable electronic device, the microprogrammable electronic device comprising a first code memory, in which instructions are stored, and being configured to execute each of the instructions stored in the first code memory at a respective instruction cycle, bearing computer-executable instructions that, when executed upon a computer, cause the computer to perform operations comprising:
   generating binary codes, each of which indicates a corresponding execution-related event; and
   outputting the binary codes to a tracing device on a single pin of the microprogrammable electronic device at a corresponding instruction cycle, each binary code comprising N bits, where N is an integer greater than or equal to two, the tracing device being coupled with the single pin to receive the binary codes, and comprising a second code memory in which the instructions are stored, each instruction being stored in the second code memory at a memory address corresponding to a memory address in the first code memory in which that instruction is stored.

12. The non-transitory computer-readable storage medium of claim 11, further bearing computer-executable instructions that, when executed upon a computer, cause the computer to perform operations comprising:
   generating and outputting a current binary code at a current instruction cycle, in which the corresponding execution-related event indicated by the current binary code occurs.

13. The non-transitory computer-readable storage medium of claim 12, wherein the memory addresses are arranged in a same given sequence in the first and in the second code memory, and wherein the current binary code indicates one of following execution-related events:
   the microprogrammable electronic device is executing a first or second predetermined instruction in the current instruction cycle;
   the microprogrammable electronic device, in the current instruction cycle, is executing a first current instruction stored, in the first and in the second code memory, at a first memory address which, in the given sequence in which the memory addresses are arranged in the first and in the second code memory, follows a second memory address at which is stored, in the first and in the second code memory, a first preceding instruction executed by the microprogrammable electronic device in the instruction cycle temporally preceding the current instruction cycle;

the microprogrammable electronic device is executing a first instruction of a predetermined interrupt routine in the current instruction cycle; or the microprogrammable electronic device, in the current instruction cycle, is executing:

either a second current instruction which is the same as a second preceding instruction executed by the microprogrammable electronic device in the instruction cycle temporally preceding the current instruction cycle; or a third current instruction stored, in the first and in the second code memory, at a third memory address which, in the given sequence in which the memory addresses are arranged in the first and in the second code memory, does not follow a fourth memory address at which is stored, in the first and in the second code memory, a third preceding instruction, executed by the microprogrammable electronic device in the instruction cycle temporally preceding the current instruction cycle.

14. The non-transitory computer-readable storage medium of claim 13, wherein the second current instruction is a wait instruction which, when executed by the microprogrammable electronic device, causes the microprogrammable electronic device to check whether a predetermined condition occurs, and to continue executing the wait instruction until the predetermined condition occurs.

\* \* \* \* \*

UNITED STATES PATENT AND TRADEMARK OFFICE
CERTIFICATE OF CORRECTION

| | |
|---|---|
| PATENT NO. | : 8,656,366 B2 |
| APPLICATION NO. | : 12/848929 |
| DATED | : February 18, 2014 |
| INVENTOR(S) | : Claudio Genta et al. |

It is certified that error appears in the above-identified patent and that said Letters Patent is hereby corrected as shown below:

<u>Title Page</u>

Item (73) Assignee

Delete "(IL)" and insert --(IT)-- therefor.

Signed and Sealed this
Seventh Day of October, 2014

Michelle K. Lee
*Deputy Director of the United States Patent and Trademark Office*